Patented Jan. 14, 1936

2,027,429

UNITED STATES PATENT OFFICE 2,027,429

PACKING PROCESS

Carl Hilmer Hansen, Oakland, Calif., assignor to John Hansen, Oakland, Calif.

No Drawing. Application December 19, 1931, Serial No. 582,188

6 Claims. (Cl. 99—8)

My present invention relates to a new means and method for preserving foodstuffs and the like and more particularly to an improved container and method of packing for the distribution of coffee.

One object of my invention is to provide a novel arrangement and method of packing foodstuffs by a combination of evacuation and permeation with carbon dioxide or other suitable inert gas.

Another object of my invention is to provide a method whereby carbon dioxide gas can be easily and conveniently sealed in an evacuated container.

A further object of my invention is to provide a new and novel method of packing ground coffee in which a coffee improving and preserving gas is present.

My invention also includes the method of handling the gas for this and other purposes such as the preserving, handling and shipping of any product requiring preservation by the exclusion of air where the air is replaced by carbon dioxide or other suitable gas. It is a further object of my invention to make use of carbon dioxide because of its preserving qualities, and to provide a system of handling the gas which also improves the purity of the delivered article for use.

It is also an object of my invention to provide a method which prevents mold as well as excluding the air with all its destructive bacterial elements, for carbon dioxide gas absorbs moisture and prevents mold.

It is also an object of my invention to provide a novel and highly efficient process for packing foodstuffs and particularly coffee which can be carried out in a simple and convenient manner with present types of packing and sealing apparatus.

The food preserving qualities of carbon dioxide gas have long been well known, but in connection with all prior applications of this gas to the preservation of foods, etc., expensive and complicated apparatus has been necessary.

As early as August 23, 1898, Octave de Santa Cruz disclosed in his United States Patent Number 609,590, issued on the above date, a process for preserving food that comprises a relatively large vat from which the air can be pumped and into which carbon dioxide gas under pressure may be introduced.

In this particular disclosure it is proposed to maintain the apparatus at a refrigerating temperature by any suitable refrigerating means. The vat is also so constructed that it can be opened and closed at frequent intervals to permit the introduction and removal of foodstuffs to be temporarily preserved. In operation the vat is always connected with the evaporating apparatus and with a source of carbon dioxide gas so that the gas therein can be maintained at a substantially constant pressure.

In a later disclosure by James W. Martin in his Patent Number 1,825,645, allowed September 29, 1931, there is disclosed a method of milking in which solidified carbon dioxide is used to sterilize milk during the milking operations.

In each of the above disclosures the apparatus and methods of operation are inapplicable to the uses for which the applicant's present invention is designed.

In the Martin disclosure the solid carbon dioxide is utilized for its refrigerating characteristic and consequently he does not provide for a final sealing of the milk dispensing bottles before the solid carbon dioxide has gasified, nor does his disclosure contemplate the retention of any of the initial refrigerating gas in the milk containers when the milk is distributed for consumption, in fact if this were done with the present form of bottle cap the cap would be blown off before delivery.

In connection with coffee it is well known that the coffee bean is composed of fibrous tissues formed into tiny cells and that when the bean is roasted carbon dioxide gas is formed in these cells.

It is also known that in roasting the coffee bean there is developed an aromatic or volatile oil which when exposed to the atmosphere will evaporate from the coffee. The roasted coffee also contains a vegetable or fixed oil that has a tendency to become rancid when exposed to the oxygen of the atmosphere.

Coffee has very definite and individual characteristics which are not possessed by any other food commodity. It must be roasted before use and since this roasting accelerates the volatilization of the natural oils and gas contained therein it is imperative that the coffee be used as soon after roasting as possible. There are comparatively few people who live so near a coffee roasting plant that they can be sure of getting coffee the day it is roasted and therefore it is necessary to provide a means for shipping the coffee from the roasting apparatus to the consumer with a minimum loss of the oils and gas contained therein.

From the above it will be appreciated that when the coffee bean is roasted and ground some means must be provided to preserve the natural qualities and aroma of the coffee.

At the present time the practice is to seal the ground coffee in suitable evacuated containers. While this method of packing serves to preserve the natural qualities and aroma of the coffee from the time of sealing until the container is finally opened, it permits a considerable amount of the natural carbon dioxide gas in the coffee to escape from the grounds and into the container where it is finally lost to the atmosphere as soon as the container is opened.

In order to improve upon the above practice and to also provide a novel method of introducing a carbon dioxide gas into an evacuated container, I propose to place a piece of solidified carbon dioxide in the container prior to the evacuation thereof and then seal the container before the solid carbon dioxide has completely sublimed.

The sealing of coffee and other commodities in an evacuated container is usually carried out in one of two ways; in one method the container after being filled is passed into an evacuated chamber where the sealing is completed, and in another method the container is completely closed and sealed except for a small aperture in the top or bottom through which the air is exhausted, the small aperture being closed by a drop of solder after the proper vacuum is produced within the container.

In carrying out my invention with either of the above methods of sealing it is only necessary to place the proper amount of solidified carbon dioxide in the container at the time the coffee or other commodity is placed therein. At this point care should be taken to provide enough solid carbon dioxide and to regulate the time of evacuation so as to prevent a complete withdrawal of the solid carbon dioxide as a gas. In practice I have found that only a small piece of the solid gas or carbonic ice, weighing not over a few grams, is sufficient. A cube of the solidified gas $\frac{1}{16}''$ on a side is sufficient for a one pound container of coffee. For larger containers the amount of carbonic ice will be proportionately greater.

After a container has been charged and removed from the sealing machine it will be found that the ends thereof will be bowed inwardly, indicating a pressure less than atmospheric therein. However, after the container has stood several hours it will be found that its ends will bow outwardly, thus indicating that the solid carbon dioxide has sublimed and created a pressure within the container.

In view of the above it should be pointed out that where I have used the term "evacuated container" I mean a container from which the atmosphere with its constituent gases has been exhausted, and not necessarily a container having a reduced pressure within.

My present invention is the result of many months of experiment made in an attempt to improve upon the present methods of packing and dispensing coffee and like commodities. Practical tests have shown conclusively that coffee packed in accordance with my process possesses qualities of freshness and taste far superior to the same coffee packed by the prevailing vacuum method. In fact, expert tasters have found that the quality and taste of coffee packed by my process is not only superior to vacuum packed coffee at the time of opening the containers, but that the difference in quality and taste becomes more pronounced from day to day after the containers of the compared coffees have been opened. In other words, the coffee packed by my process has been found to keep its freshness and taste longer after the container is opened than does the coffee packed by the vacuum process. It is believed that this latter feature is explained by the fact that the carbon dioxide gas remains in the coffee after the lid is removed and also protects the coffee by preventing the oxygen of the atmosphere entering the container.

From the above it will be seen that my invention provides a simple and convenient method of charging evacuated containers with carbon dioxide gas without the use of expensive and complicated gas injecting apparatus, and that when carbon dioxide gas is used in connection with the packing of ground coffee the gas also performs an additional and desirable function by compensating for any deficiency of natural carbon dioxide gas in the coffee caused by losses during the roasting and grinding operations, and thus provides a better coffee for the ultimate consumer.

The term carbon dioxide used above is to be understood as including all forms of compressed carbon dioxide whether it be solid or poroused. A commercial product suitable for my purposes which can be purchased in solid form is known as "Dry Ice."

While I have, for the sake of clearness and in order to disclose my invention so that the same can be readily understood, outlined and described a specific use and procedure, I desire to have it understood that this invention may be embodied in other ways and put to other uses that will suggest themselves to persons skilled in the art. It is believed that this invention is broadly new and it is desired to claim it as such so that all such changes as come within the scope of the appended claims are to be considered as part of this invention.

Having thus described my invention, what I claim and desire to secure by Letters Patent is—

1. The method of packing coffee which comprises providing a sealable container into which the coffee may be placed, depositing a predetermined amount of solidified carbon dioxide in the container with the coffee, immediately and rapidly evacuating the container in the presence of the solidified carbon dioxide to exhaust all air therefrom and while maintaining the vacuum sealing the container before the solidified carbon dioxide has completely evaporated.

2. The method of packing coffee which comprises placing the coffee in a sealable container with a predetermined amount of solidified carbon dioxide, rapidly evacuating the air from the container and sealing the container before the solid carbon dioxide has been reduced to gaseous form and without breaking the vacuum, the valve of vacuum and amount of said carbon dioxide used during the operation being so proportioned that upon gasifying the carbon dioxide will produce a predetermined pressure greater than atmospheric within the container.

3. The method of preserving coffee which comprises placing a predetermined amount of carbonic ice in a sealable container with the coffee, rapidly evacuating the air from the container and sealing off while maintaining the vacuum and before the carbonic ice has completely gasified, the amount of carbonic ice being such that after gasification it will produce a pressure within the container.

4. The method of charging an evacuated container for coffee with a preserving gas which comprises depositing a predetermined amount of solidified carbon dioxide within the container with the coffee, subjecting the container to evacuation, and finally sealing the container in its evacuated condition before the solidified carbon dioxide has completely sublimed, the amount of solid carbon dioxide used and the duration of the evacuating operation being so proportioned that sufficient unsublimed solid carbon dioxide will be left in the container after evacuation and sealing to produce a pressure within the container.

5. The method of charging an evacuated container for dry packed commodities with a preserving gas which comprises depositing a predetermined amount of solidified carbon dioxide within the container with the commodity, subjecting the container to rapid evacuation, and immediately sealing the container in its evacuated condition before the solidified carbon dioxide has completely sublimed, the amount of solid carbon dioxide used and the duration of the evacuating operation being so proportioned and timed that sufficient unsublimed carbon dioxide will be left in the container after evacuation and sealing to produce a carbon dioxide gas under a greater than atmospheric pressure within the container.

6. The method of preserving dry packed perishable substances which comprises placing the substance to be preserved in a sealable container with a predetermined amount of solidified carbon dioxide, subjecting the container with the substance and the carbon dioxide therein to evacuation, and immediately sealing the container in an evacuated condition before the carbon dioxide has had time to completely gasify.

CARL HILMER HANSEN.